Figures 1, 2:
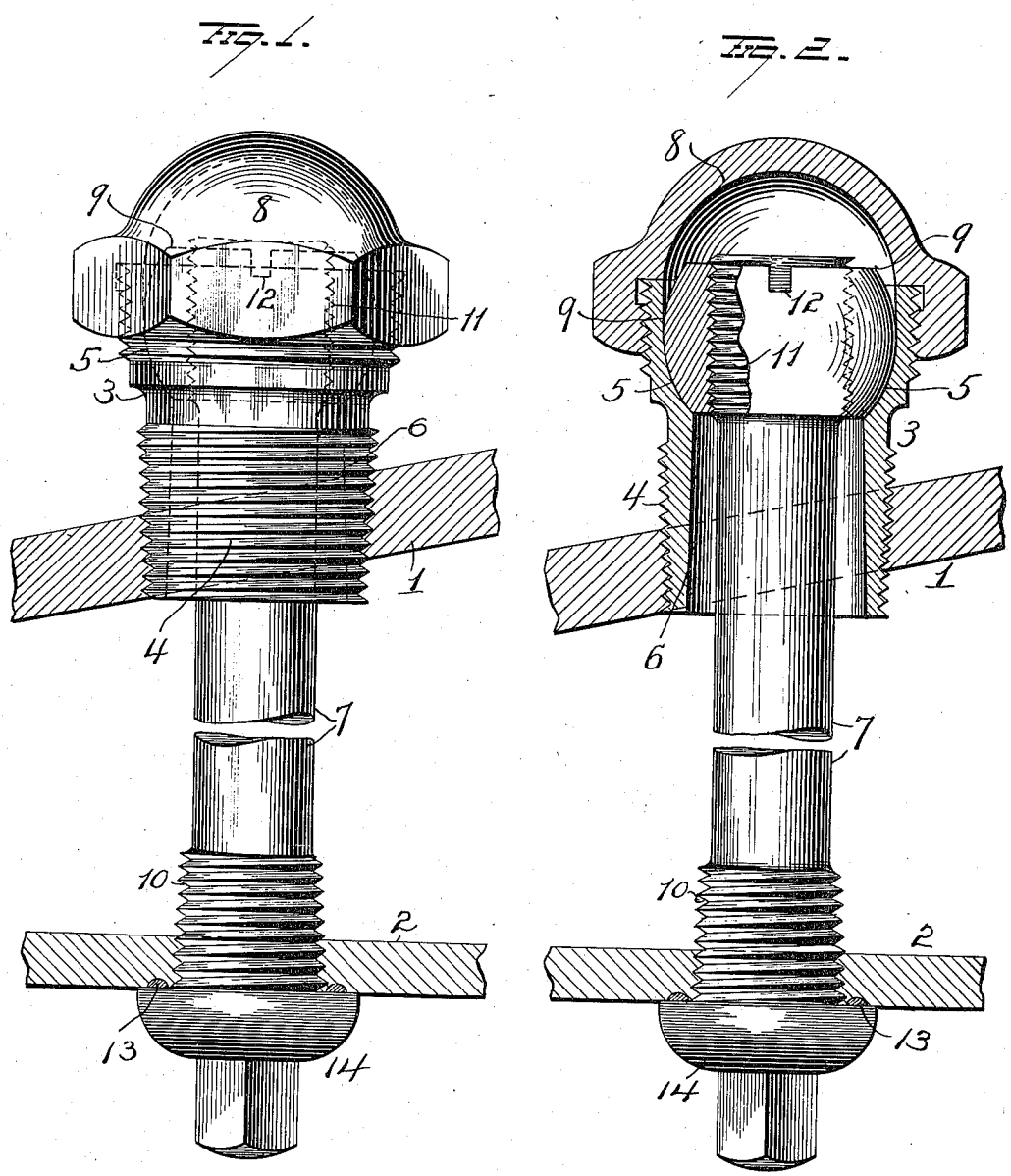

B. E. D. STAFFORD.
FLEXIBLE STAY BOLT FOR BOILERS.
APPLICATION FILED JULY 15, 1910.

984,863.

Patented Feb. 21, 1911.

WITNESSES

INVENTOR
B. E. D. Stafford
Attorney

UNITED STATES PATENT OFFICE.

BENJAMIN E. D. STAFFORD, OF PITTSBURG, PENNSYLVANIA, ASSIGNOR TO THE FLANNERY BOLT COMPANY, OF PITTSBURG, PENNSYLVANIA.

FLEXIBLE STAY-BOLT FOR BOILERS.

984,863.  Specification of Letters Patent.  Patented Feb. 21, 1911.

Application filed July 15, 1910.  Serial No. 572,208.

*To all whom it may concern:*

Be it known that I, BENJAMIN E. D. STAFFORD, of Pittsburg, in the county of Allegheny and State of Pennsylvania, have invented certain new and useful Improvements in Flexible Stay-Bolts for Boilers; and I do hereby declare the following to be a full, clear, and exact description of the invention, such as will enable others skilled in the art to which it appertains to make and use the same.

My invention relates to an improvement in flexible stay bolts for boilers, the object being to provide improvements which will permit the bolts to be adjusted and locked after they have all been assembled so as to secure uniform tension on all the bolts, and which will also permit of ready inspection and testing of all the bolts from the outside.

With these and other objects in view my invention consists in the details of construction and combinations of parts as will be more fully described and pointed out in the claims.

In the accompanying drawings, Figure 1 is a view in section through sections of the roof and crown sheets showing the bolt and its parts in side elevation and Fig. 2 is a similar view with the sleeve cap and nut partly in elevation and partly in section, and showing the nut locked to the bolt.

1 represents the roof sheet, and 2 the crown sheet of the boiler, and 3 the sleeve having a tapered and threaded end 4 mounted in a tapped hole in the roof sheet. This sleeve is provided in a plane outside of the roof sheet with an internal seat 5 curved in the arc of a circle on which the rounded head of the stay bolt rests, and its bore below said seat is made flaring downwardly as at 6 so as to permit of free and unrestricted movement of the bolt 7. The outer end of the sleeve is covered by a cap 8, which is screwed onto the outer end of the sleeve and forms a closure for the latter. This cap is rounded on its inner surface and coöperates with the rounded seat in the sleeve to form a housing for the head 9 of bolt 5. The cavity in the sleeve 3 and cap 8 for the head 9 of the bolt, is considerably longer than the head of the latter so as to permit of the necessary movement of the bolt due to the expansion, contraction and movements of the roof and crown sheets. The bolt 7 is of the button head type as shown, and is provided at its inner end with a threaded section 10, preferably tapered, for engagement with a tapped hole in the crown sheet 3, and is also provided at its upper and outer end with a threaded section 11 engaged by the removable rounded nut or head 9 of the stay bolt. This nut has flattened ends and curved sides as shown and is provided with the slots for a driver or wrench by which it is turned, or held while being attached to the bolt 7. After the nut or head has been properly adjusted it is locked in place by upsetting the metal at the end of the bolt into one or both slots 12 of the nut or head 9 thus locking the latter against any movement. The bolt 7 is introduced through the crown sheet and if desired suitable packing rings 13 may be interposed between the button head 14 and the face of crown sheet 2.

In assembling the parts, after the bolt 7 and sleeve 3 have been secured in place the head 9 of the bolt is screwed onto the threaded end of the bolt and after the whole series of bolts have been so secured in place, the heads 9, which are in planes outside of the roof sheets may all be adjusted alike and in this way prevent unequal tension on the bolts and sheets, and after the heads have been so adjusted they are locked by upsetting the metal at the ends of the bolts into the slots 12 as before explained. By projecting the bolts through the outer or roof sheets they are accessible for ready examination and inspection by simply removing the caps 8. If inspection discloses a defective or broken stay, it can be removed by simply cutting out the metal from slot 12 in the head and withdrawing the bolt through the crown sheet.

When first heating a boiler the crown sheet expands and carries with it the bolts. By providing elongated recesses for the heads, the movement of the bolts does not transmit its movement to the roof sheet but on the contrary provides for differences in expansion between the crown sheet of the fire box and roof sheet of the boiler. As the roof sheet heats up it also expands and carries the sleeves out against the heads of the bolts, so that by the time steam begins to form, the heads will be firmly seated on the sleeves. By this construction I avoid all excessive outward strains on the roof sheet when the latter is cold, and provide for practically uniform strains on all the bolts at all times and under all conditions.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters Patent, is:—

1. A stay bolt structure comprising a sleeve threaded externally and provided internally with a rounded seat for the head of the stay bolt, the said seat being in a plane above or beyond the externally threaded portion of the sleeve, a recessed cap for closing the outer end of said sleeve and a button head stay bolt, having a threaded upper end and a rounded head screwed onto said threaded end.

2. A stay bolt structure comprising a sleeve threaded externally and provided internally with a rounded seat for the head of the stay bolt, the said seat being in a plane above or beyond the externally threaded portion of the sleeve, a recessed cap for closing the outer end of said sleeve and a button head stay bolt, having a threaded upper end and a rounded head screwed onto said threaded end, and provided with a slot into which the metal of the bolt is upset for locking the head to the bolt.

3. A stay bolt structure comprising a sleeve threaded externally and provided internally with a rounded seat for the head of the stay bolt, a cap having a rounded or curved recess conforming to the recess in the sleeve, for closing the outer end of the latter, and a button head stay bolt having a threaded upper end and a rounded head screwed onto said threaded end and resting in the curved housing formed by the sleeve and cap.

In testimony whereof I have signed this specification in the presence of two subscribing witnesses.

BENJAMIN E. D. STAFFORD.

Witnesses:
EDWIN S. RYCE,
WM. Y. MCNABB.